(12) United States Patent
Sekiguchi

(10) Patent No.: US 8,208,110 B2
(45) Date of Patent: Jun. 26, 2012

(54) ELECTRO-OPTICAL APPARATUS

(75) Inventor: Yuji Sekiguchi, Chitose (JP)

(73) Assignee: Seiko Epson Corporation, Tokyo (JP)

( * ) Notice: Subject to any disclaimer, the term of this patent is extended or adjusted under 35 U.S.C. 154(b) by 215 days.

(21) Appl. No.: 12/697,615

(22) Filed: Feb. 1, 2010

(65) Prior Publication Data
US 2010/0220277 A1   Sep. 2, 2010

(30) Foreign Application Priority Data
Mar. 2, 2009   (JP) ................................. 2009-047840

(51) Int. Cl.
*G02F 1/1343* (2006.01)
(52) U.S. Cl. ........................................ 349/139
(58) Field of Classification Search .................. None
See application file for complete search history.

(56) References Cited

U.S. PATENT DOCUMENTS 4,340,305 A * 7/1982 Smith et al. .................. 356/509

FOREIGN PATENT DOCUMENTS

| JP | 8-106100 A | 4/1996 |
|---|---|---|
| JP | 11-38423 A | 2/1999 |
| JP | 11-326936 A | 11/1999 |
| JP | 2003-280003 A | 10/2003 |
| JP | 2008-182008 A | 8/2008 |

OTHER PUBLICATIONS

Machine translation of JP 9-139557.*

* cited by examiner

*Primary Examiner* — Lucy Chien
(74) *Attorney, Agent, or Firm* — AdvantEdge Law Group, LLC

(57) ABSTRACT

An electro-optical apparatus includes a first substrate, a second substrate and a conductive pad formed on the outside of a display region of the first substrate. A mark portion configured of a multiple concentric-circle pattern formed upon the first or second substrate so as to overlap with the conductive pad.

8 Claims, 4 Drawing Sheets

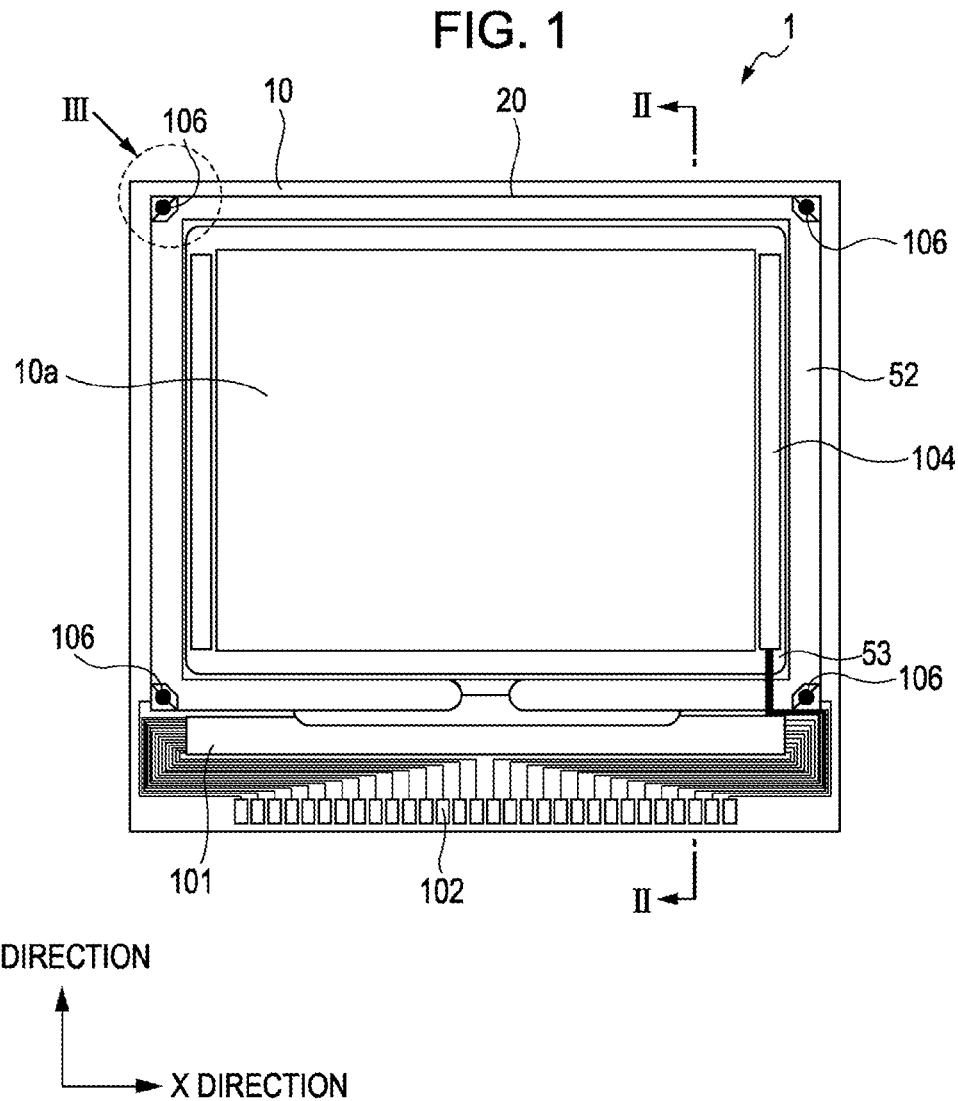
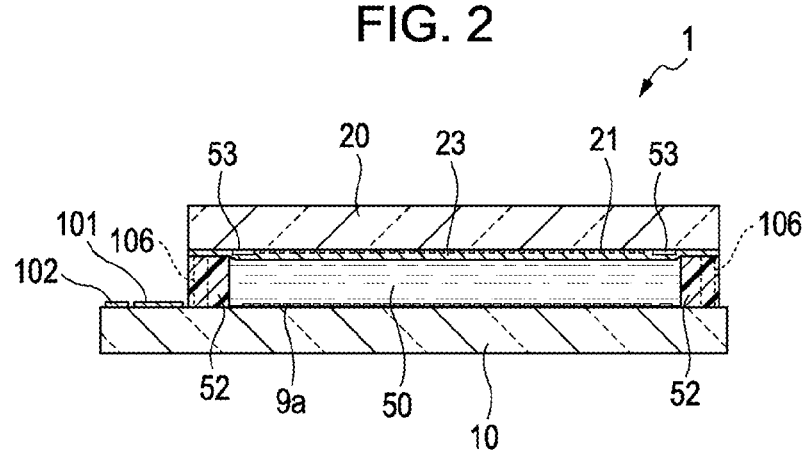

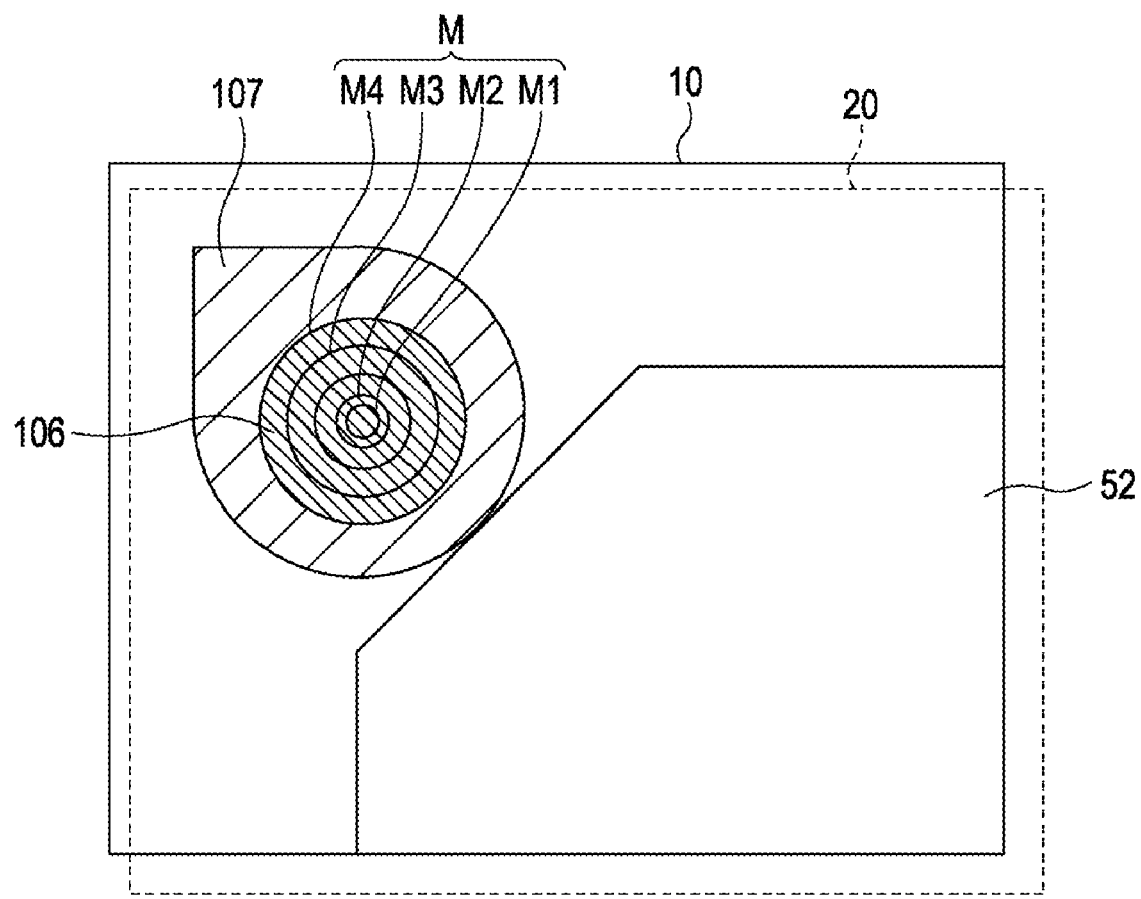

STANDARD VALUE A1: MIN STANDARD VALUE OF RADIUS
OF UNHARDENED CONDUCTIVE MATERIAL
STANDARD VALUE A2: MAX STANDARD VALUE OF RADIUS
OF UNHARDENED CONDUCTIVE MATERIAL
STANDARD VALUE A3: MIN STANDARD VALUE OF RADIUS OF
HARDENED CONDUCTIVE MATERIAL
STANDARD VALUE A4: MAX STANDARD VALUE OF RADIUS OF
HARDENED CONDUCTIVE MATERIAL

ELECTRO-OPTICAL APPARATUS

BACKGROUND

1. Technical Field

The present invention relates to the technical field of electro-optical apparatuses such as a liquid crystal apparatus and manufacturing methods thereof, the liquid crystal apparatus being able to examine whether or not the formation locations and sizes of conductive portions that electrically connect two substrates sandwiching a liquid crystal layer to each other conform to a specified value.

2. Related Art

With a liquid crystal apparatus, which is an example of such an electro-optical apparatus, a sealant is provided so as to laminate two substrates sandwiching a liquid crystal layer to each other. For example, JP-A-8-106100 and JP-A-2003-280003 disclose techniques for managing the rendering width of the sealant. JP-A-11-38423, meanwhile, discloses a technique for managing the line width of the sealant.

With such a liquid crystal apparatus, the two substrates are electrically connected to each other via conductive portions formed upon conductive pads that are in turn formed outside of the display region (for example, see JP-A-11-326936). The conductive portions are normally formed by applying an appropriate amount of an unhardened and fluid conductive material on the conductive pads, laminating the two substrates to each other, and then hardening the conductive material.

However, if the unhardened conductive material is not formed upon the conductive pads in a predetermined location and at a predetermined size, connection failures occur between the two substrates, which is problematic in that it is a cause of a drop in display capabilities in electro-optical apparatuses such as liquid crystal apparatuses. This problem can occur in the same manner in the conductive portions after hardening as well.

In addition, if the formation location of the conductive portions deviates from a specified value that specifies a desired location, or if the size of the conductive portions deviates from a specified value, the thickness of the liquid crystal apparatus will deviate from the design value, which leads to a problem in that the optical capabilities that allow light to pass through the liquid crystal apparatus will drop.

SUMMARY

An advantage of some aspects of the invention is to provide an electro-optical apparatus such as a liquid crystal apparatus formed so that, for example, an electrical connection between two substrates can be made securely and the overall thickness of the apparatus does not deviate from a design value, and to provide a method of manufacturing such an apparatus.

An electro-optical apparatus according to an aspect of the invention includes: a first substrate and a second substrate that are laminated to each other; conductive pads formed on the outside of a display region of the first substrate; conductive portions formed of a conductive material between the first and second substrates so as to overlap with the conductive pads; and mark portions configured of a multiple concentric-circle pattern formed upon the first or second substrate so as to overlap with the conductive pads, the mark portions being for confirming the formation location of the conductive material after the conductive material has been applied.

With the electro-optical apparatus according to this aspect of the invention, the conductive pads are formed using, for example, an opaque metallic material, and are formed on the outside of the display region so as not to interfere with the display of images while the electro-optical apparatus is operating. These optical pads are formed, for example, at each of the four corners of the first substrate.

The second substrate is a transparent substrate such as, for example, a glass substrate, a silica substrate, or the like, and is disposed upon the first substrate so as to oppose the first substrate.

The conductive portions are formed of a conductive material between the first and second substrates so as to overlap with the conductive pads. These conductive portions are formed by hardening a conductive material that has been applied upon the conductive pads in an unhardened state.

The mark portions are configured of a multiple concentric-circle pattern formed upon the first or second substrate so as to overlap with the conductive pads, and being for confirming the formation location of the conductive material after the conductive material has been applied. In the case where, for example, the conductive pads have been formed at each of the four corners of the first substrate, these mark portions are formed corresponding to each of the conductive pads. Each mark portion has a multiple concentric-circle pattern that makes it possible to confirm the formation location of the conductive material after the conductive material has been applied. Accordingly, during the manufacturing process for the electro-optical apparatus, the mark portions make it possible to easily confirm the formation locations of the conductive portions configured of the conductive material after the conductive material has been applied, through an optical method, or to be more specific, visual viewing.

Accordingly, with the electro-optical apparatus according to this aspect of the invention, the formation locations of the post-application conductive material can easily be examined during the manufacturing process to ensure that a secure electrical connection is made between the first and second substrates and so that the overall thickness of the apparatus does not deviate from the design value.

An electro-optical apparatus according to another aspect of the invention includes: a first substrate and a second substrate that are laminated to each other; conductive pads formed on the outside of a display region of the first substrate; conductive portions formed of a conductive material between the first and second substrates so as to overlap with the conductive pads; and mark portions configured of a multiple concentric-circle pattern formed upon the first or second substrate so as to overlap with the conductive pads, the mark portions being for confirming the formation location of the conductive material after the first and second substrates have been laminated to each other.

With the electro-optical apparatus according to this aspect of the invention, the formation location of the conductive portions can easily be examined during the manufacturing process.

According to another aspect of the electro-optical apparatus according to the invention, the conductive portions may be formed by irradiating the conductive material with light from the side of the light-transmissive second substrate, thereby hardening the conductive material, and the line widths of the multiple patterns be set so as not to interfere with the light-hardening when the conductive material is hardened by the light.

According to this aspect of the invention, it is possible to harden the conductive portions quickly and with certainty while also enabling the examination of the formation locations and sizes of the conductive portions. Note that the line widths of the multiple patterns can in practice be set within a manufacturing efficiency range that is permissible with respect to the light-hardening characteristics of the conductive material, the wavelength and strength of the irradiated light, and the light-irradiation process during the manufacturing process of the electro-optical apparatus.

According to another aspect of the electro-optical apparatus of the invention, the mark portions may be reflective.

According to this aspect of the invention, the mark portions can be seen more clearly through an optical method for viewing the mark portions from the side of the second substrate, or to be more specific, when viewing the mark portions visually.

A manufacturing method for an electro-optical apparatus according to another aspect of the invention includes: a first process of forming conductive pads on the outside of a display region of a first substrate; a second process of forming mark portions, each having a multiple concentric-circle pattern, in regions overlapping with the conductive pads of the second substrate when the second substrate is disposed so as to oppose the first substrate; a third process of applying a conductive material upon the mark portions; a fourth process of disposing the second substrate upon the first substrate; a fifth process of forming conductive portions by hardening the conductive material; and at least one of a sixth process of examining whether or not the formation locations of the conductive material deviate from a specified value prior to performing the fifth process and a seventh process of examining whether or not the formation locations of the conductive portions deviate from a specified value after performing the fifth process.

According to the manufacturing method for an electro-optical apparatus according to this aspect of the invention, as with the aforementioned electro-optical apparatus, the formation locations of the conductive material and conductive portions can easily be examined during the manufacturing process to ensure that a secure electrical connection is made between the first and second substrates and so that the overall thickness of the apparatus does not deviate from the design value, thus making it possible to manufacture a high-quality electro-optical apparatus.

These and other effects and advantages of the invention will be made clear from the embodiment described hereinafter.

BRIEF DESCRIPTION OF THE DRAWINGS

The invention will be described with reference to the accompanying drawings, wherein like numbers reference like elements.

FIG. 1 is a plan view of a liquid crystal apparatus according to an embodiment of the invention.

FIG. 2 is a cross-section viewed along the II-II line shown in FIG. 1.

FIG. 3 is an enlarged plan view illustrating an enlarged view of a region III shown in FIG. 1.

DESCRIPTION OF EXEMPLARY EMBODIMENTS

Figure 4:
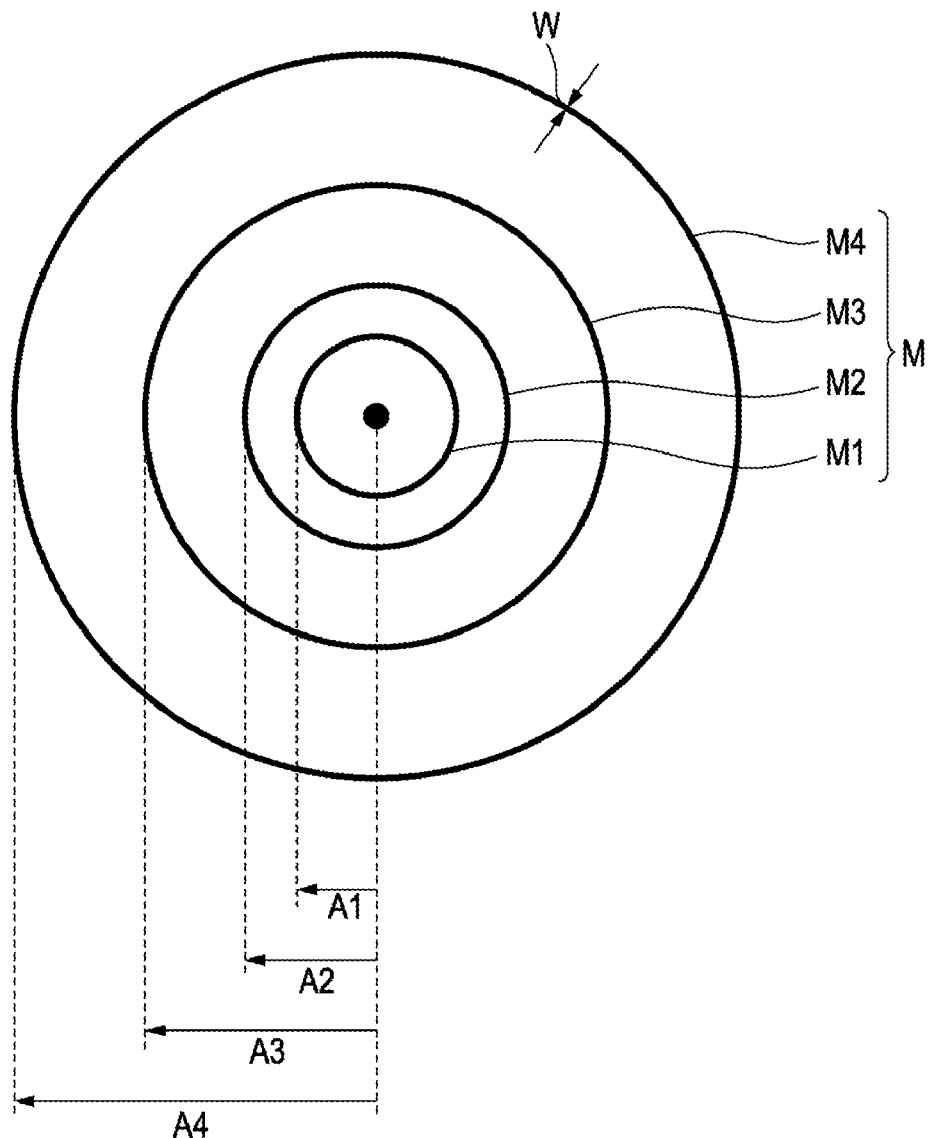
FIG. 4 is a plan view schematically illustrating the configuration of mark portions.

Hereinafter, a liquid crystal apparatus, serving as an embodiment of an electro-optical apparatus according to the invention, and a manufacturing method thereof will be described with reference to the drawings.

1: Liquid Crystal Apparatus

First, the overall configuration of a liquid crystal apparatus 1 according to this embodiment will be described with reference to FIGS. 1 and 2. FIG. 1 is an overall plan view of the liquid crystal apparatus 1 viewed from the side of an opposing substrate, also illustrating a TFT array substrate and the various constituent elements formed thereupon, and FIG. 2 is a cross-section viewed along the II-II line shown in FIG. 1. Here, a TFT active-matrix liquid crystal apparatus having an internal driving circuit will be described as an example.

In FIGS. 1 and 2, the liquid crystal apparatus 1 is provided with a TFT array substrate 10, which is an example of a "first substrate" according to the invention, and an opposing substrate 20, which is an example of a "second substrate" according to the invention, disposed opposite to each other. The TFT array substrate 10 and the opposing substrate 20 are transparent substrates such as glass substrates, silica substrates, or the like. A liquid crystal layer 50 is confined between the TFT array substrate 10 and the opposing substrate 20, and the TFT array substrate 10 and opposing substrate 20 are fixed to each other by a sealant 52 provided in a seal region located around the outside of an image display region 10a, which is an example of a "display region" according to the invention.

The sealant 52 is configured of, for example, an ultraviolet light-hardened resin, heat-hardened resin, or the like for laminating the substrates to each other, and in the manufacturing process, is hardened through ultraviolet light irradiation, the application of heat, or the like after being applied to the TFT array substrate 10. Spacers such as glass fibers, glass beads, or the like are mixed in the sealant 52 in order to ensure that the space between the TFT array substrate 10 and the opposing substrate 20 (the inter-substrate gap) is a predetermined value.

A light-blocking film frame 53, which has light-blocking properties and defines the border region of the image display region 10a, is provided on the side of the opposing substrate 20 in parallel with the inner edge of the seal region in which the sealant 52 is disposed. However, some or all of this light-blocking film frame 53 may be provided on the side of the TFT array substrate 10 as an internal light-blocking film.

A data line driving circuit 101 and an external circuit connection terminal 102 are provided along one side of the TFT array substrate 10, in the region located on the outside of the seal region in which the sealant 52 is disposed, that is within the peripheral region surrounding the image display region 10a. A scanning line driving circuit 104 is provided along one of the two sides that are adjacent to that side, and is provided so as to be covered by the light-blocking film frame 53. Note that two scanning line driving circuits 104 may be disposed along the two sides that are adjacent to the side of the TFT array substrate 10 on which the data line driving circuit 101 and external circuit connection terminal 102 are provided. In this case, the two scanning line driving circuits 104 are connected to each other by multiple wires provided along the remaining side of the TFT array substrate 10.

Note that during the operation of the liquid crystal apparatus 1, the data line driving circuit 101 and the scanning line driving circuit 104 are driven by power sources VDD and VSS and a common potential LCCOM supplied from a power source circuit (not shown).

Upper and lower conductive members 106, which are examples of "conductive portions" according to the invention and function as upper and lower conductive terminals between the substrates, are disposed in the four corner portions of the opposing substrate 20. Meanwhile, conductive pads 107 (see FIG. 3) are provided in the regions of the TFT array substrate 10 opposite to the corner portions. Accordingly, electrical conductivity is achieved between the TFT array substrate 10 and the opposing substrate 20.

As shown in FIG. 2, a pixel electrode 9a is formed upon the TFT array substrate 10 after wiring for a pixel switching TFT, scanning lines, data lines, and the like have been formed, and an alignment layer is then formed upon the pixel electrode 9a. Meanwhile, in addition to an opposing electrode 21, a grid-shaped or stripe-shaped light-blocking film 23 is formed upon the opposing substrate 20, and an alignment layer is then formed as the uppermost layer thereof. The liquid crystal layer 50 is configured of liquid crystals in which one or more types of nematic liquid crystals coexist, and these liquid crystals are in a predetermined state of orientation between the two alignment layers.

Next, the configuration of the corners of the liquid crystal apparatus 1 will be described in detail with reference to FIG. 3. FIG. 3 is a plan view illustrating in detail the configuration of one of the four corners of the liquid crystal apparatus 1 shown in FIG. 1. Note that FIG. 3 is a plan view of a region III as seen from the side of the opposing substrate 20, and for the sake of simplicity, the opposing substrate 20, which is superimposed over the TFT array substrate 10 and is disposed in the foreground in FIG. 3, is indicated by a dotted line.

As shown in FIG. 3, the liquid crystal apparatus 1 includes the conductive pad 107, a mark portion M, and upper and lower conductive members 106.

The conductive pad 107 is formed upon the TFT array substrate 10 on the outside of the image display region 10a and on the outside of the sealant 52. The conductive pad 107 is formed by first forming a reflective conductive film, such as an aluminum film, upon the TFT array substrate 10 and then by patterning the conductive film using a generic patterning method.

The upper and lower conductive members 106 are formed so as to enable an electrical connection between the conductive pads 107 and the opposing substrate 20, and are formed, for example, by hardening an unhardened conductive material that has been applied upon the mark portion M that is formed upon the opposing substrate 20. Note that the mark portion M may be formed so as to overlap with the conductive pad 107 formed upon the TFT array substrate 10, or may be formed upon the conductive pad 107 on the TFT array substrate 10. In this case, the conductive material is applied upon the mark portion M formed upon the conductive pad 107.

The mark portion M includes multiple concentric circular patterns M1, M2, M3, and M4, which serve as an index by which it can be judged whether or not the formation location and size of the unhardened conductive material that has been applied deviate from specified values.

During the manufacturing process for the liquid crystal apparatus 1, the mark portion M can be used to easily determine through an optical method, or to be more specific, by viewing, for example, the opposing substrate 20 from above, whether or not the formation locations and sizes of the conductive portions deviate from specified values immediately after the conductive material has been applied and after the TFT array substrate 10 and the opposing substrate 20 have been laminated to each other.

Accordingly, with the liquid crystal apparatus 1, the formation locations and sizes of the conductive portions (the upper and lower conductive members 106) can easily be examined during the manufacturing process to ensure that a secure electrical connection is made between the TFT array substrate 10 and the opposing substrate 20 via the upper and lower conductive members 106 and so that the overall thickness of the apparatus does not deviate from the design value.

Next, the configuration of the mark portion M will be described in detail with reference to FIG. 4. FIG. 4 is a plan view schematically illustrating the configuration of a mark portion.

The mark portion M is configured so as to include four patterns M1, M2, M3, and M4 that are formed as progressive concentric circles.

A specified value A1, which corresponds to the radius of the pattern M1, represents a specified value that defines the minimum value of the size of the upper and lower conductive members 106 when formed by applying the conductive material upon the mark portion M, or in other words, when in an unhardened state prior to laminating the TFT array substrate 10 and the opposing substrate 20 to each other. A specified value A2, which corresponds to the radius of the pattern M2, represents a specified value that defines the maximum value of the size of the upper and lower conductive members 106 when formed by applying the conductive material, or in other words, when in an unhardened state prior to laminating the TFT array substrate 10 and the opposing substrate 20 to each other.

By using the patterns M1 and M2 and viewing the opposing substrate 20 from above, it is possible to visually examine whether or not the formation locations and sizes of the conductive portions formed by applying the conductive material, or in other words, of the unhardened upper and lower conductive members 106 prior to laminating the TFT array substrate 10 and the opposing substrate 20 to each other, are between the specified values A1 and A2.

A specified value A3, which corresponds to the radius of the pattern M3, is a specified value that defines the minimum value of the size of the conductive portions (upper and lower conductive members 106) after the TFT array substrate 10 and the opposing substrate 20 have been laminated to each other and in a state where the conductive materials have been hardened. A specified value A4, which corresponds to the radius of the pattern M4, is a specified value that defines the maximum value of the size of the conductive portions (upper and lower conductive members 106) after the TFT array substrate 10 and the opposing substrate 20 have been laminated to each other and in a state where the conductive materials have been hardened.

By using the patterns M3 and M4 and viewing the opposing substrate 20 from above, it is possible to examine whether or not the formation locations and sizes of the upper and lower conductive members 106 are between the specified values A3 and A4.

In this embodiment, because the conductive pad 107 is a reflective conductive pattern formed of aluminum, silver, or the like, when the mark portion M is viewed from the side of the opposing substrate 20, it is easy to see whether the location of the conductive portions (upper and lower conductive members 106) following the hardening of the conductive material deviate from the mark portion M, the manner in which the conductive portions overlap with the mark portion M is normal or not, and so on.

Furthermore, in this embodiment, because the upper and lower conductive members 106 are conductive portions formed by applying a conductive material upon the mark portion M and irradiating the conductive material from the side of the opposing substrate 20 when manufacturing the liquid crystal apparatus 1, the line widths W of the multiple patterns M1, M2, M3, and M4 are set to widths that do not interfere with the hardening process when hardening the conductive materials with light. More specifically, the line widths W of the multiple patterns M1, M2, M3, and M4 can in practice be set within a manufacturing efficiency range that is permissible with respect to the light-hardening characteristics of the conductive material that is applied, the wavelength and strength of the irradiated light, and the light-irradiation process within the manufacturing process of the liquid crystal apparatus 1, and the widths are formed so as to be, for example, 5 μm.

Accordingly, the mark portion M makes it possible to examine the formation locations and sizes of the conductive materials and the upper and lower conductive members 106 before and after the process for laminating the TFT array substrate 10 and the opposing substrate 20 to each other and harden the unhardened conductive portions quickly and with certainty, in order to ensure that a secure electrical connection is made between the TFT array substrate 10 and the opposing substrate 20 and the overall thickness of the liquid crystal apparatus 1 does not deviate from the design value.

According to this liquid crystal apparatus 1, the formation locations and sizes of the conductive portions (upper and lower conductive members 106) can be examined with ease during the manufacturing process before and after the process for laminating the TFT array substrate 10 and the opposing substrate 20 to each other, in order to ensure that a secure electrical connection is made between the TFT array substrate 10 and the opposing substrate 20 via the upper and lower conductive members 106 and so that the overall thickness of the liquid crystal apparatus 1 does not deviate from the design value. In addition, a drop in optical characteristics caused by the thickness of the liquid crystal apparatus 1 deviating from the design value can be suppressed.

Although the mark portion M is described in this embodiment being configured so as to include four patterns, or M1, M2, M3, and M4, it should be noted that the mark portion M may include only a pattern portion made up of a set of the patterns M1 and M2 or a pattern portion made up of a set of the patterns M3 and M4. With such a mark portion M, it is possible to examine whether or not the formation location and size of at least one of conductive materials immediately after application and the conductive portions (upper and lower conductive members 106) for electrically connecting the TFT array substrate 10 and the opposing substrate 20 to each other deviate from the specified values; therefore, a higher-quality liquid crystal apparatus can be manufactured than when manufacturing a liquid crystal apparatus without performing a process for examining the formation location and size of the conductive portions (upper and lower conductive members 106) before and after the process for laminating the TFT array substrate 10 and the opposing substrate 20 to each other.

2: Manufacturing Method for Liquid Crystal Apparatus

Figure 5:
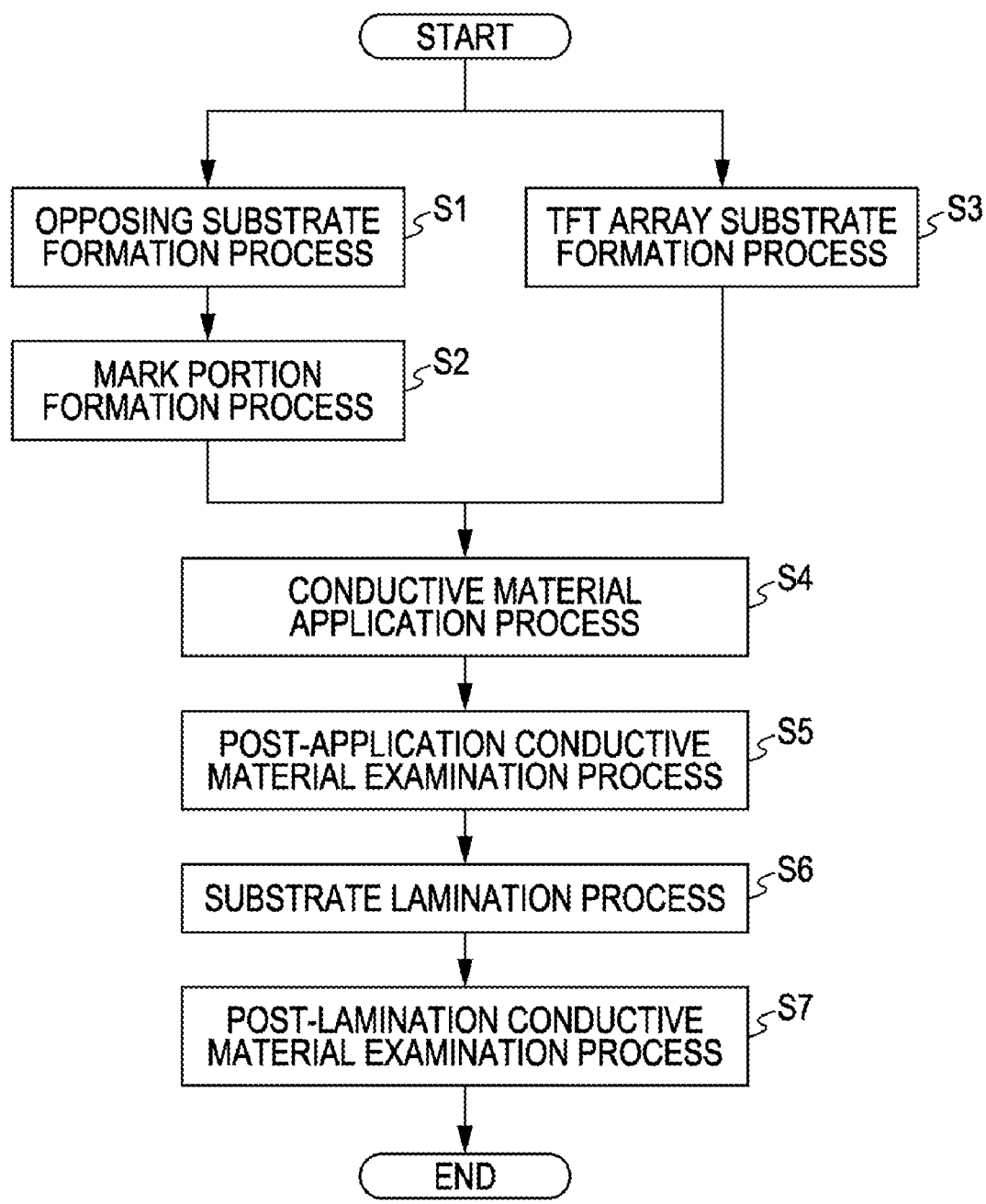
FIG. 5 is a flowchart illustrating, in order, the main processes of a manufacturing method for a liquid crystal apparatus according to an embodiment of the invention.

Next, a liquid crystal apparatus manufacturing method for manufacturing the liquid crystal apparatus 1 will be described with reference to FIG. 5. FIG. 5 is a flowchart illustrating, in order, the main processes of a manufacturing method for a liquid crystal apparatus according to an embodiment of the invention. Although the method in this embodiment is described as including a post-application conductive material examination process and a post-substrate lamination conductive material examination process, which are respectively examples of a "sixth process" and a "seventh process" according to the invention, before and after a conductive material hardening process, mentioned later, which is an example of a "fifth process" according to the invention, it should be noted that it is acceptable for the manufacturing method for a liquid crystal apparatus according to this embodiment to include at least one of the post-application conductive material examination process and the post-substrate lamination conductive material examination process.

First, in an opposing substrate formation process, constituent elements such as an opposing electrode and the like are formed in the opposing substrate 20 (S1). In parallel to or before or after this, as a TFT array substrate formation process, which is an example of a "first process" according to the invention, the conductive pads 107 are formed in the TFT array substrate 10 in which constituent elements such as switching elements, pixel electrodes, and the like have been formed (S3). The conductive pads 107 are formed by first forming a reflective conductive film such as aluminum, silver, or the like in a predetermined region upon the TFT array substrate 10 and then patterning that conductive film.

In a mark portion formation process, which is an example of a "second process" of the invention and is executed after the opposing substrate formation process, the mark portions M are formed in regions of the opposing substrate 20 that will overlap with the surfaces of the conductive pads 107 in a state facing the TFT array substrate 10 when the opposing substrate 20 is later disposed so as to oppose the TFT array substrate 10 (S2).

Next, in a conductive material application process, which is an example of a "third process" according to the invention, the conductive material is applied in an unhardened state upon, for example, the mark portions M that have been formed in the opposing substrate 20 (S4). Note that the conductive material may be applied upon mark portions M in the TFT array substrate 10 in the case where the mark portions M are formed upon the conductive pads 107 in the TFT array substrate 10.

Next, in the post-application conductive material examination process, it is examined whether or not the formation locations and sizes of the conductive portions deviate from the range between the specified values A1 and A2 (S5).

Then, in a substrate lamination process, which is an example of a "fourth process" according to the invention, the opposing substrate 20 and the TFT array substrate 10 are laminated to each other by first applying the sealant to the opposing substrate 20 (or to the TFT array substrate 10) and then disposing the opposing substrate 20, in which the mark portions M have been formed, upon the TFT array substrate 10, in which the conductive pads 107 have been formed (S6).

Next, in the post-substrate lamination conductive material examination process, it is examined whether or not the formation locations and sizes of the upper and lower conductive members 106 deviate from the range between the specified values A3 and A4 (S7). Note that the upper and lower conductive members 106, which are the conductive portions, are hardened prior to this examination process.

After this, a liquid crystal apparatus 1 that has been determined to be of proper quality in the examination processes is passed through a predetermined process, thereby completing the liquid crystal apparatus 1.

Accordingly, as with the aforementioned liquid crystal apparatus, with the manufacturing method for a liquid crystal apparatus according to this embodiment, the formation locations and sizes of the conductive portions (upper and lower conductive members 106) can be detected with ease during the manufacturing process before and after the process for laminating the TFT array substrate 10 and the opposing substrate 20 to each other, in order to ensure that a secure electrical connection is made between the TFT array substrate 10 and the opposing substrate 20 via the upper and lower conductive members 106 and so that the overall thickness of the liquid crystal apparatus 1 does not deviate from the design value. This makes it possible to manufacture a high-quality liquid crystal apparatus 1.

In addition, with the manufacturing method for a liquid crystal apparatus according to this embodiment, it is easily possible to visually examine whether or not the formation locations and sizes of the upper and lower conductive members 106, which are the conductive portions, are within the specified values before and after the processes for laminating the TFT array substrate 10 and the opposing substrate 20 to each other, using the mark portions M as an index; this makes it possible to reduce the time required for examining the liquid crystal apparatus 1. To be more specific, the inventors confirmed that incorporating an examination process that uses the aforementioned mark portions M as an index into the manufacturing method for liquid crystal apparatuses makes it possible to reduce the examination time by approximately 1%, compared to when the liquid crystal apparatuses are examined without referring to the mark portions M. This reduction in examination time has an effect of improving the manufacturing efficiency, and this effect becomes particularly important as more liquid crystal apparatuses pass through this process. Accordingly, in the case where, for example, a liquid crystal apparatus manufacturing process involves manufacturing several hundreds of thousands of liquid crystal apparatuses each month, the effects on the overall liquid crystal apparatus manufacturing process are extremely great.

What is claimed is:

1. An electro-optical apparatus comprising:
   a first substrate and a second substrate that are laminated to each other;
   a conductive pad formed on an outside of a display region of the first substrate;
   a conductive portion formed of a conductive material between the first and second substrates so as to overlap with the conductive pad; and
   a mark portion configured of a multiple concentric-circle pattern formed upon the first or second substrate so as to overlap with the conductive pad, the mark portion being for confirming a formation location of the conductive material after the conductive material has been applied,
   wherein:
      the multiple concentric-circle pattern includes a first circle pattern and a second circle pattern;
      the second circle pattern has a radius larger than the first circle pattern; and
      the second circle pattern surrounds the first circle pattern.

2. An electro-optical apparatus comprising:
   a first substrate and a second substrate that are laminated to each other;
   a conductive pad formed on an outside of a display region of the first substrate;
   a conductive portion formed of a conductive material between the first and second substrates so as to overlap with the conductive pad; and
   a mark portion configured of a multiple concentric-circle pattern formed upon the first or second substrate so as to overlap with the conductive pad, the mark portion being for confirming a formation location of the conductive material after the first and second substrates have been laminated to each other,
   wherein:
      the multiple concentric-circle pattern includes a first circle pattern and a second circle pattern;
      the second circle pattern has a radius lamer than the first circle pattern; and
      the second circle pattern surrounds the first circle pattern.

3. The electro-optical apparatus according to claim 2,
   wherein the conductive portion is formed by irradiating the conductive material with light from a side of the light-transmissive second substrate, thereby hardening the conductive material; and
   the line widths of the multiple patterns are set so as not to interfere with light-hardening when the conductive material is hardened by the light.

4. The electro-optical apparatus according to claim 1, wherein the mark portion is reflective.

5. The electro-optical apparatus according to claim 1, wherein:
   the first circle pattern has a radius corresponding to a specified minimum value of the size of the conductive material; and
   the second circle pattern has a radius corresponding to a specified maximum value of the size of the conductive material.

6. The electro-optical apparatus according to claim 1, wherein the mark portion is further configured to confirm a formation location of the conductive material after the first and second substrates have been laminated to each other.

7. The electro-optical apparatus according to claim 1, wherein:
   the conductive portion is formed by irradiating the conductive material with light from a side of the light-transmissive second substrate, thereby hardening the conductive material; and
   the line widths of the multiple concentric-circle pattern are set so as not to interfere with light-hardening when the conductive material is hardened by the light.

8. The electro-optical apparatus according to claim 1, further comprising:
   a liquid crystal layer disposed between the first substrate and the second substrate.

* * * * *